United States Patent [19]

Inaji et al.

[11] Patent Number: 4,633,150
[45] Date of Patent: Dec. 30, 1986

[54] DRIVING CIRCUIT FOR BRUSHLESS DC MOTORS

[75] Inventors: Toshio Inaji, Mino; Hiroshi Minakuchi, Shiga; Yoshiaki Igarashi, Ikoma, all of Japan

[73] Assignee: Matsushita Electric Industrial Co., Ltd., Kadoma, Japan

[21] Appl. No.: 804,259

[22] Filed: Dec. 3, 1985

[30] Foreign Application Priority Data

Dec. 25, 1984 [JP] Japan .................................. 59-277169
Jun. 24, 1985 [JP] Japan .................................. 60-137255

[51] Int. Cl.$^4$ ............................................. H02P 6/02
[52] U.S. Cl. .................................... 318/254; 318/138; 318/439
[58] Field of Search ................... 318/138, 254, 254 A, 318/439

[56] References Cited

U.S. PATENT DOCUMENTS 4,114,073 9/1978 Uzuka .............................. 318/138
4,442,386 4/1984 Uchida et al. ..................... 318/254

FOREIGN PATENT DOCUMENTS

57-49386   3/1982 Japan ................................. 318/254
59-194693 11/1984 Japan ................................. 318/254
59-194694 11/1984 Japan ................................. 318/254
59-198891 11/1984 Japan ................................. 318/254

Primary Examiner—William M. Shoop, Jr.
Assistant Examiner—Bentsu Ro
Attorney, Agent, or Firm—Wenderoth, Lind & Ponack

[57] ABSTRACT

A driving circuit for a brushless DC motor having a small amount of torque ripple comprises a magnetic pole position detecting circuit for detecting positions of magnetic poles of a rotor magnet and delivering polyphase signals indicating the positions, a rectifier adder circuit for producing a sum of positive or negative portions of the polyphase signals from the magnetic pole position detecting circuit, a first error amplifier for adjusting a gain of the magnetic pole position detecting circuit to make an output signal of the rectifier adder circuit to be proportional to an instruction signal, a power supply circuit for supplying currents to armature coils in response to the polyphase signals, a modulating signal producing circuit for producing a modulating signal synchronized with the rotation of the motor, and a second error amplifier for adjusting a gain of the power supply circuit to make the currents supplied to the armature coils to be proportional to the modulating signal.

17 Claims, 8 Drawing Figures

DRIVING CIRCUIT FOR BRUSHLESS DC MOTORS

BACKGROUND OF THE INVENTION

1. Field of the Invention

The present invention relates to a driving circuit for driving brushless DC motors.

2. Description of the Prior Art

In recent years, brushless DC motors which have their excited armature phases switched in turn by semiconductor devices (such as transistors) according to signals from rotor position detectors (such as Hall effect devices) have been used in audio and video equipment. Usually, a brushless DC motor needs one rotor position detector and one armature excitation control circuit for exciting each phase. Accordingly, as the number of the phases of the motor increases, complexity of the control circuits increases. This would make the motor expensive and bulky. Hence, this scheme is not put into practical use. Therefore, in general, armatures of two or three phases are adopted. This has normally resulted in torque ripples ranging from 15 to 20% $_{p-p}$, increasing variations in the motor speed. As a result, the wow or flutter of the audio or video equipment using such a motor increases.

Brushless DC motors recently available frequently make use of Hall effect devices as rotor position detectors. As is well known, Hall effect devices widely vary in sensitivity. For this reason, various circuit techniques have been employed to accommodate such sensitivity variations. Further, many attempts have been made to reduce torque ripples of brushless DC motors.

Japanese Laid-Open Pat. No. 59-35585 (hereinafter referred to as "reference 1") discloses a typical technique that uses three Hall effect devices as rotor position detectors. The scheme of the driving circuit disclosed in reference 1 is not described in detail herein, but, the operation of the driving circuit is characterized in that the coils are switched at such timings that the signals from the Hall effect devices become zero so as to be less affected by the sensitivity variations among the devices. Further, the operation is characterized in that the electric currents supplied to the coils are partially modulated in response to a signal synchronized with the rotation of the motor for canceling out the torque ripples.

The driving apparatus disclosed in the aforementioned reference 1 operates based on the timings at which the signals from the Hall effect devices become zero. This offers the advantage that the driving circuit is insusceptible to the sensitivity variations among the Hall effect devices. However, since the armature coils are alternately energized and deenergized, filter circuits containing relatively large capacitors for reducing the spike-like voltage produced by the switching of the coils need to be provided at the power supply terminals to the coils. Also, the driving circuit has the disadvantage that it is likely to produce vibration and noise, because the electric currents flowing into the coils are suddenly caused to cease and commence.

SUMMARY OF THE INVENTION

It is an object of the present invention to provide a driving circuit for brushless DC motors which is hardly affected by sensitivity variations among rotor position detector devices and by offset of the detector devices, and produces low vibration, low noise, and low torque ripples.

In order to achieve this object, a driving circuit for a brushless DC motor according to the present invention comprises: a magnetic pole position detecting circuit for detecting positions of magnetic poles of a rotor magnet of the motor and delivering polyphase signals indicative of the positions; a rectifier adder circuit for producing a sum of positive or negative portions of the polyphase signals from the magnetic pole position detecting circuit; an instruction signal producing circuit for producing a torque instruction signal instructing a torque to be produced by the motor; a first error amplifier for adjusting a gain of the magnetic pole position detecting circuit to make an output signal of the rectifier adder circuit to be proportional to the torque instruction signal; a power supply circuit responsive to the polyphase signals for supplying currents to polyphase armature coils; current detecting means for detecting the currents supplied to the armature coils; a modulating signal producing circuit for modulating the currents supplied to the armature coils; and a second error amplifier for adjusting a gain of the power supply circuit to make an output signal of the current detecting means equal to an output signal of the modulating signal producing circuit.

The magnetic pole position detecting circuit may comprises rotor position detector devices, buffer amplifiers and subtractors. Output signals from the detector devices are amplified by the buffer amplifiers, and difference signals between two of output signals of the buffer amplifiers are produced by the subtractor circuits. The rectifier adder circuit produces the sum of positive or negative portions of the difference signals from the subtractor circuits. The output signal of the rectifier adder circuit is controlled to be a constant value proportional to the torque instruction signal. The torque instruction signal may be an externally given signal. As a result, even if the detector devices vary in sensitivity or in offset, torque ripples are hardly produced. Therefore, it is not necessary to take measures either to accommodate sensitivity variations among detector devices or to adjust their offset.

The electric currents supplied to polyphase armature coils are converted into a voltage which is so controlled as to coincide with a modulating signal synchronized with the rotation of the motor. More specifically, the currents supplied to the armature coils are so modulated as to have a phase reversed from that of the torque ripples remaining in the motor. This can cancel low-order components of the torque ripples, whereby a circuit for driving a brushless DC motor showing little torque ripples can be obtained.

The position signals from the position detecting circuit are amplified by the power supply circuit and then supplied to the polyphase armature coils. Therefore, each of the supplied current signals has a sinusoidal waveform. Thus, energization of the coils is not controlled by sudden switching action. Hence, no spike-like voltage (which would normally be caused by switching of electric current) is generated. This can dispense with a filter circuit which has a relatively large capacitor for reducing such spike-like voltage.

The above and other objects, features and advantages of the invention will be apparent from consideration of the following description taken in conjunction with the accompanying drawings in which:

DESCRIPTION OF THE PREFERRED EMBODIMENTS

Figure 2:
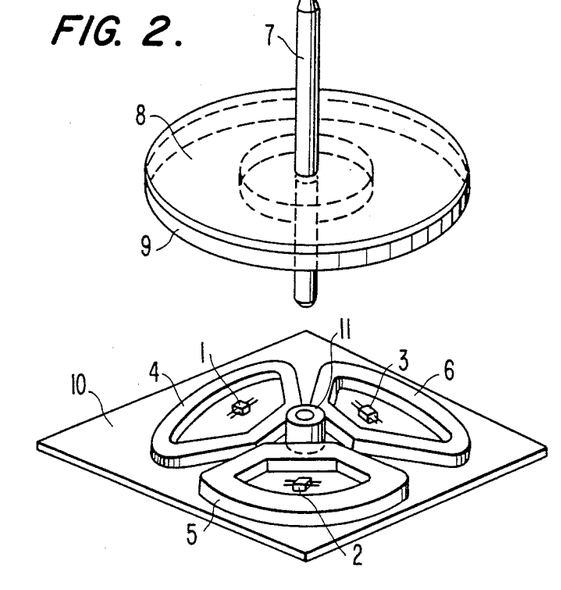
FIG. 2 is a perspective view of a main portion of a motor to which the invention is preferable applied.

FIG. 2 is a perspective view of a main portion of an electric motor to which the invention is preferably applied. This motor has a rotating shaft 7 mounting thereon a disk 8 made of soft iron which serves as a back yoke. A disklike rotor magnet 9 is rigidly fixed to the bottom surface of the disk 8 to constitute a rotor.

Three-phase armature coils 4, 5, 6 are mounted on a stator 10 made of a soft iron plate. The shaft 7 is rotatably held by a bearing 11 that is secured to the stator 10 at a position surrounded by the coils 4, 5, 6. Hall effect devices 1, 2, 3 are disposed at the centers of the coils 4, 5, 6, respectively, and used to detect a position of the rotor by detecting a magnetic field generated by the rotor magnet 9.

Figure 1:
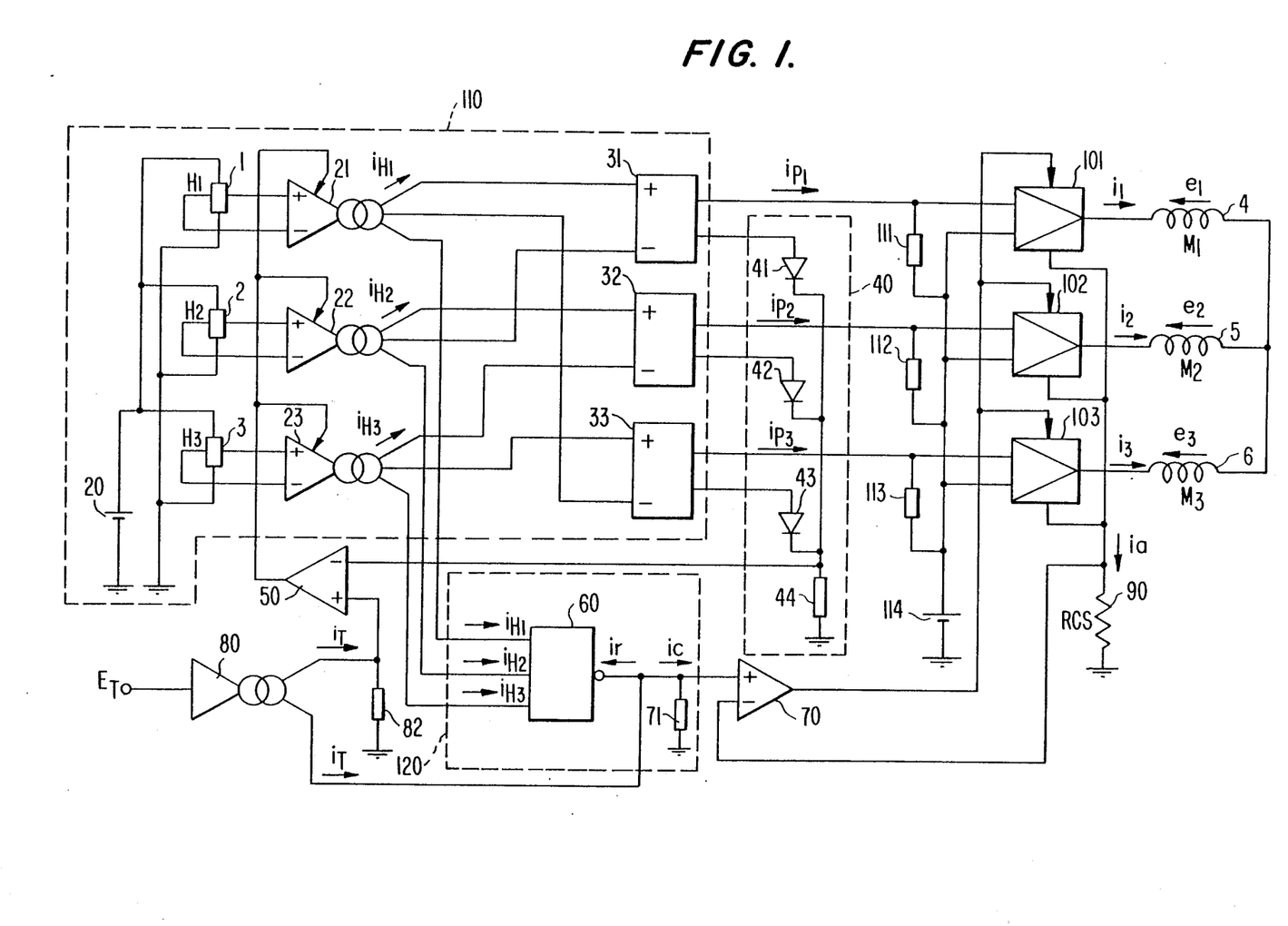
FIG. 1 is a circuit diagram showing an embodiment of driving circuit according to the invention.

FIG. 1 is a circuit diagram showing an example of driving circuit according to the invention. The driving circuit has a magnetic pole position detecting circuit 110 that detects positions of magnetic poles of the rotor magnet 9 and delivers three-phase signals indicating the positions. The detecting circuit 110 has a DC power supply 20 for supplying a voltage to the three Hall effect devices 1, 2, 3. Buffer amplifiers 21, 22, 23 are provided after the Hall effect devices 1, 2, 3, respectively. In this example, the amplifiers 21-23 respectively convert differential output signals from the Hall effect devices 1-3 into currents $i_{H1}$, $i_{H2}$, $i_{H3}$, which are proportional to the differential output signals. Each of the amplifiers 21-23 delivers three output currents of same magnitude.

The detecting circuit 110 further includes subtractor circuits 31, 32, 33. The output current $i_{H1}$ of the buffer amplifier 21 and the output current $i_{H2}$ of the buffer amplifier 22 are applied to the subtractor circuit 31 which produces a difference signal between them, i.e., a current $i_{P1}$ ($=i_{H1}-i_{H2}$). The output current $i_{H2}$ of the buffer amplifier 22 and the output current $i_{H3}$ of the buffer amplifier 23 are supplied to the subtractor circuit 32 which produces a difference signal between them, i.e., a current $i_{P2}$ ($=i_{H2}-i_{H3}$). Similarly, the output current $i_{H3}$ of the buffer amplifier 23 and the output current $i_{H1}$ of the buffer amplifier 21 are supplied to the subtractor circuit 33 which produces a difference signal between them, i.e., a current $i_{P3}$ ($=i_{H3}-i_{H1}$). Each of the subtractor circuits 31, 32, 33 produces two output currents of same magnitude. The electric currents $i_{P1}$, $i_{P2}$, $i_{P3}$ produced by the subtractor circuits 31, 32, 33, respectively, are applied to power supply circuits 101, 102, 103, respectively. The other output currents of the subtractor circuits 31, 32, 33 are supplied to a rectifier adder circuit 40 consisting of diodes 41, 42, 43 and a resistor 44. The circuit 40 allows only the positive portions of the output currents $i_{P1}$, $i_{P2}$, $i_{P3}$ of the subtractor circuits 31, 32, 33 to be applied to the resistor 44 to thereby produce a voltage corresponding to a sum of the rectified currents.

An instruction signal producing circuit 80 has two output terminals at each of which an electric current (torque instruction signal) $i_T$ proportional to a signal $E_T$ instructing a torque appears. One output current $i_T$ is applied to a resistor 82 so as to be converted into a voltage which is applied to one input terminal of a first error amplifier 50. The other input terminal of the amplifier 50 receives the sum of the rectified currents from the rectifier adder circuit 40. The first error amplifier 50 adjusts gains of the amplifiers 21-23 in such a way that the two input voltages applied thereto become equal to each other.

A modulating signal producing circuit 120 receives the currents $i_{H1}$, $i_{H2}$, $i_{H3}$ from the buffer amplifiers 21, 22, 23 and the torque instruction signal $i_T$ from the instruction signal producing circuit 80, and delivers a modulating signal $i_c$. The circuit 120 is composed of an absolute value adder circuit 60 for converting the currents $i_{H1}$, $i_{H2}$, $i_{H3}$ into absolute values and summing up them, and a combining circuit for delivering the modulating signal $i_c$ which is a difference between the instruction signal $i_T$ from the circuit 80 and an output current $i_r$ from the adder circuit 60.

The three-phase armature coils 4, 5, 6 are connected in Y (star) and respectively supplied with output currents $i_1$, $i_2$, $i_3$ of the power supply circuits 101, 102, 103, respectively. The input operating points of the circuits 101-103 are determined by a DC power supply 114. Resistors 111, 112 and 113 are provided to respectively change the output currents $i_{P1}$, $i_{P2}$, $i_{P3}$ of the subtractor circuits 31, 32, 33 into voltages.

A resistor ($R_{cs}$) 90 is used to detect the currents $i_1$, $i_2$, $i_3$ supplied to the coils 4, 5, 6 as voltages. A second error amplifier 70 has two input terminals to one of which a voltage detected by the resistor 90 is applied. The modulating signal produced by the modulating signal producing circuit 120 is applied to the other input terminal. In this example, the output current $i_r$ from the absolute value adder circuit 60 is subtracted from the output current $i_T$ from the instruction signal producing circuit 80 to yield the difference current $i_c$ ($=i_T-i_r$) which is converted into a voltage by means of a resistor 71. This voltage is applied to the other input terminal of the second error amplifier 70 as the modulating signal. The second error amplifier 70 adjusts gains of the three power supply circuits 101, 102, 103 in such a way that the two input voltages applied to the second error amplifier 70 become equal to each other. The operation of the driving circuit for a brushless DC motor constructed as described above will next be described with reference to FIGS. 3, 4, 5.

Figure 3:
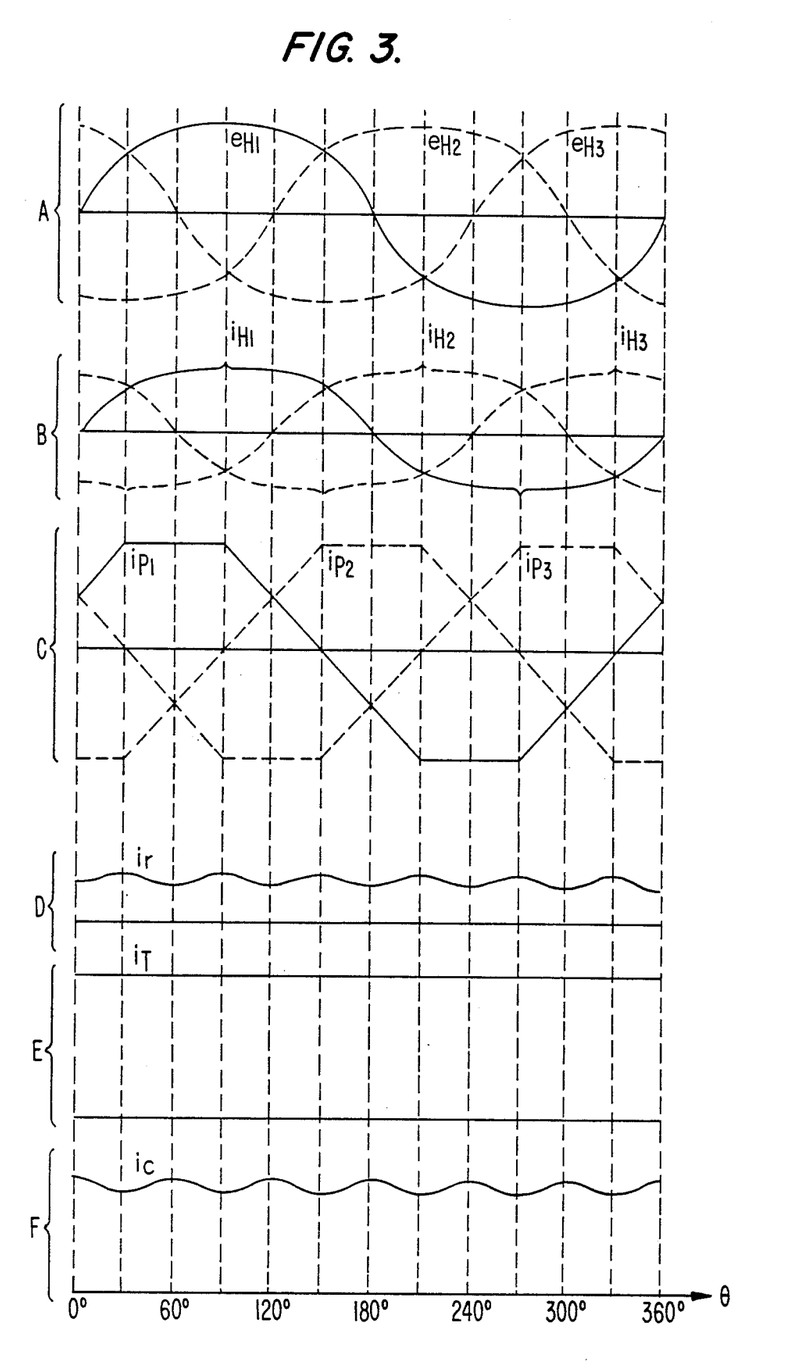
FIG. 3 is a diagram showing waveforms appearing at specified portions in the driving circuit shown in FIG. 1.

FIG. 3 shows rotating angle $\theta$ of the rotor in terms of electrical angle and waveforms appearing at specified portions in the driving circuit shown in FIG. 1. In FIG. 3, A shows waveforms of the differential output voltages $e_{H1}$, $e_{H2}$, $e_{H3}$ from the Hall effect devices 1, 2, 3. The voltage $e_{H1}$ becomes positive at a point where $\theta = 0°$. The voltage $e_{H2}$ lags relative to the voltage $e_{H1}$ by 120°. Also, the voltage $e_{H3}$ lags relative to the voltage $e_{H2}$ by 120°. It is assumed that the Hall effect devices 1, 2, 3 do not differ in sensitivity and that they show no offset.

In general, motors of permanent magnet rotor type have their permanent magnets magnetized in the form of trapezoidal wave in order to enhance the efficiency and productivity of the motors. Therefore, the differential output voltages from the Hall effect devices acting to detect the magnetic field contain harmonic components up to higher orders. In the example shown in A, components of the third, fifth and seventh orders account for 12.6%, 2.5% and 0.6%, respectively, of the fundamental wave.

In FIG. 3, B shows waveforms of the output currents $i_{H1}$, $i_{H2}$, $i_{H3}$ of the buffer amplifiers 21, 22, 23, and C shows waveforms of the output currents $i_{P1}$, $i_{P2}$, $i_{P3}$ of the subtractor circuits 31, 32, 33.

Since the buffer amplifiers 21, 22, 23, the subtractor circuits 31, 32, 33, the rectifier adder circuit 40, and the first error amplifier 50 constitute a control loop, the peak values of the output currents $i_{P1}$, $i_{P2}$, $i_{P3}$ of the subtractor circuits 31, 32, 33 become a constant value proportional to the instruction signal $i_c$ (F in FIG. 3) given to the motor. Even if the Hall effect devices differ in sensitivity and show offset, the aforementioned control loop operates to adjust the gains of the buffer amplifiers to maintain constant the peak values of the output currents $i_{P1}$, $i_{P2}$, $i_{P3}$ of the subtractor circuits 31, 32, 33.

In FIG. 3, D shows a waveform of the output current $i_r$ of the absolute value adder circuit 60. Here, the direction in which current flows into the circuit 60 is taken as positive direction. The output current $i_r$ of the absolute value adder circuit 60 is expressed as:

$$i_r = |i_{H1}| + |i_{H2}| + |i_{H3}|$$

In FIG. 3, E shows the output current $i_T$ of the instruction signal producing circuit 80. The amplitude of the current $i_T$ is in proportion to the instruction signal given to the motor. In FIG. 3, F shows the current $i_c$ flowing into the resistor 71. The relation of the current $i_c$ to the output current $i_T$ from the circuit 80 and the output circuit $i_r$ of the circuit 60 is given by $i_c = i_T - i_r$. The waveform of the current $i_c$ contains ripples of the sixth order.

Referring again to FIG. 1, as mentioned already, the power supply circuits 101, 102, 103, the resistor 90 for converting the electric currents flowing into the armature coils 4, 5, 6 into voltages, and the second error amplifier 70 constitute the control loop. The second error amplifier 70 is applied with the voltage developed by the resistor 90 and the voltage produced by the resistor 71, and adjusts the gains of the power supply circuits 101–103. The operation of the control loop will next be described by referring to FIGS. 4 and 5.

Figure 4:
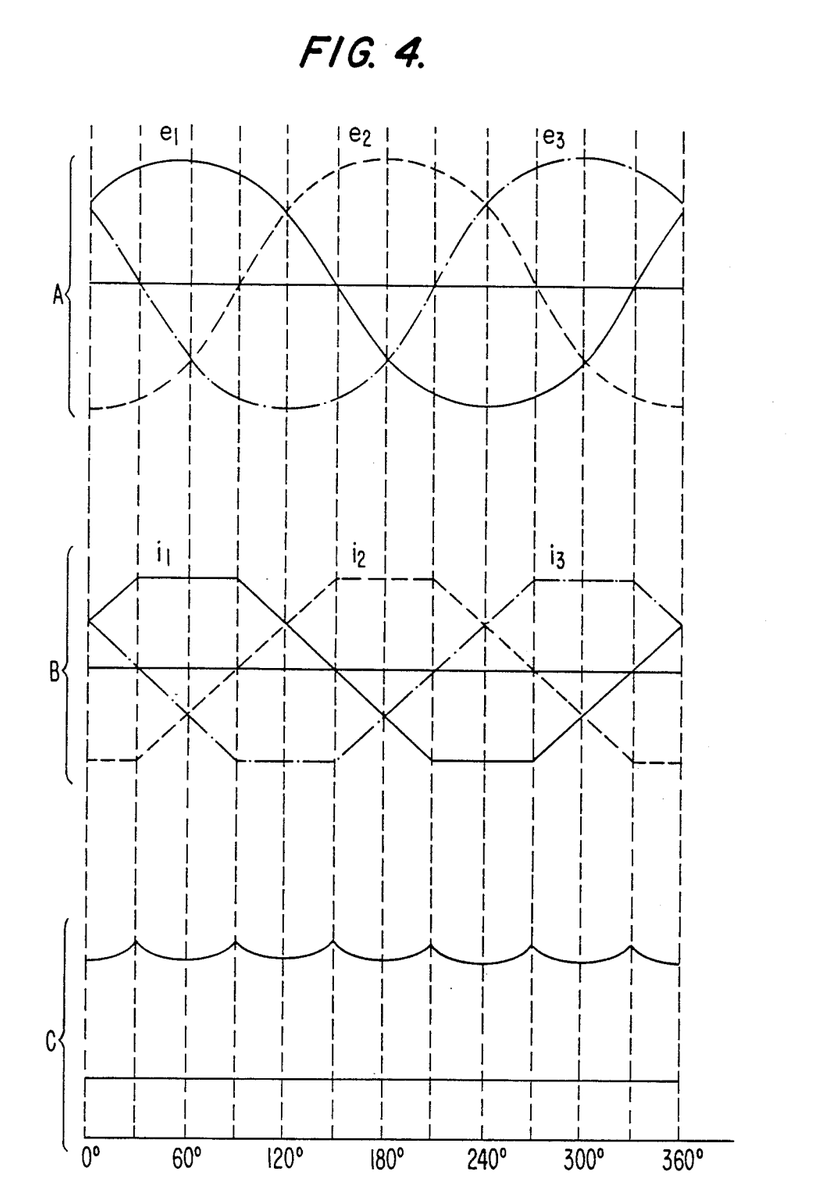
FIG. 4 is a waveform diagram obtained when the sum of the electric currents supplied to three-phase armature coils is not modulated.

FIG. 4 shows waveforms when the output terminal of the absolute value adder circuit 60 is open-circuited. In FIG. 4, A shows waveforms of the three-phase voltages $e_1$, $e_2$, $e_3$ which are induced in the three-phase armature coils 4, 5, 6, respectively, by the rotation of the rotor magnet of the motor. The induced voltage $e_1$ becomes positive at a point where $\theta = -30°$. The voltage $e_2$ lags relative to $e_1$ by 120°, and $e_3$ lags relative to $e_2$ by 120°. The voltages $e_1$, $e_2$, $e_3$ respectively lead by 30° relative to the differential output voltages $e_{H1}$, $e_{H2}$, $e_{H3}$ from the Hall effect devices. The peak values of the voltages $e_1$, $e_2$, $e_3$ induced in the coils 4, 5, 6 are assumed equal. In practice, since the shape and arrangement of the armature coils are mechanically accurately set, this assumption is considerably proper in practice. Usually, since tens of turns of wire are wound on each coil, the voltages induced in the coils contain relatively small amount of harmonics. In the example of A in FIG. 4, components of the third and fifth orders account for 7.1% and 0.4%, respectively, of the fundamental wave.

In FIG. 4, B shows the currents $i_1$, $i_2$, $i_3$ supplied to the armature coils 4, 5, 6, respectively. The output currents $i_{P1}$, $i_{P2}$, $i_{P3}$ of the subtractor circuits 31, 32, 33 are applied to the power supply circuits 101, 102, 103, respectively. Since the output signal of the absolute value adder circuit 60 is disabled, the gains of the power supply circuits 101, 102, 103 are kept at constant values corresponding to the instruction signal, so that the input signals are directly linearly amplified. Therefore, the waveforms of the currents $i_1$, $i_2$, $i_3$ supplied to the coils 4, 5, 6 resemble the waveforms of the output currents $i_{P1}$, $i_{P2}$, $i_{P3}$ of the subtractor circuits 31, 32, 33. Since the output currents $i_{P1}$, $i_{P2}$, $i_{P3}$ of the subtractor circuits 31, 32, 33 are the differences between two of the three output currents $i_{H1}$, $i_{H2}$, $i_{H3}$ of the buffer amplifiers 21, 22, 23, the following relation holds at all times:

$$i_{P1} + i_{P2} + i_{P3} = (i_{H1} - i_{H2}) + (i_{H2} - i_{H3}) + (i_{H3} - i_{H1})$$
$$= 0$$

Accordingly, the relation $i_1 + i_2 + i_3 = 0$ holds for the output currents $i_1$, $i_2$, $i_3$ which are supplied to the coils 4, 5, 6 after linearly amplified by the power supply circuits 101, 102, 103. That is, the sum of the currents flowing into the armature coils is equal to the sum of the currents flowing out of the coils. Thus, it is possible to supply electric currents to the three-phase armature coils (which are connected in Y in this example) without any difficulty. The sum of the currents flowing into the coils is retained at a constant value proportional to the instruction signal.

In FIG. 4, C shows a waveform of the torque produced by the motor when the armature coils of the motor are excited with the currents shown in B. The torque produced by the motor is proportional to a sum of products of the voltages $e_1$, $e_2$, $e_3$ (shown in A) induced in the coils and the currents $i_1$, $i_2$, $i_3$ (shown in B) supplied to the coils. That is, the torque is proportional to $(e_1 \cdot i_1 + e_2 \cdot i_2 + e_3 \cdot i_3)$. As shown in FIG. 4, the maximum value of the produced torque appears at $\theta = 30°$, 90°, 150°, 210°, ..., and the minimum value appears at $\theta = 0°$, 60°, 120°, 180°, .... The main component of the torque ripple is the sixth order component.

In the present example, when the output terminal of the absolute value adder circuit 60 is open-circuited, i.e., when the gains of the power supply circuits 101, 102, 103 are so adjusted that the sum of the currents flowing into the three-phase armature coils becomes a constant value proportional to the instruction signal, the magnitude of the produced torque ripple is about 14%$_{p-p}$.

In order to suppress this torque ripple, the gains are not controlled to keep constant the sum of the currents flowing into the coils, but rather the gains may be controlled so that the sum of the currents is so modulated as to the same in ripple rate as and reversed in phase from the torque waveform C shown in FIG. 4.

In the circuit shown in FIG. 1 for driving the brushless DC motor, the modulating signal is produced by the absolute value adder circuit 60 to suppress the torque ripple shown in FIG. 4. The output current $i_r$ (D in FIG. 3) of the circuit 60 is in phase with the torque ripple contained in the torque waveform (C in FIG. 4). To reverse the phase, the current $i_r$ is subtracted from the constant current $i_T$ (E in FIG. 3) proportional to the instruction signal to produce the modulating signal $i_c$ (F in FIG. 3). The voltage developed across the current detecting resistor 90 converts the sum of the currents flowing into the coils to a voltage which is applied to one input terminal of the second error amplifier 70. The other input terminal of the amplifier 70 receives a voltage obtained by converting the modulating signal $i_c$ by the use of the resistor 71. The modulating signal $i_c$ is the difference between the output current $i_T$ of the instruction signal producing circuit 80 and the output current $i_r$ of the absolute value adder circuit 60. The gains of the power supply circuits 101, 102, 103 are adjusted in such a manner that the two input voltages to the second error amplifier 70 become equal to each other. The ripple rate of the modulating signal $i_c$ is made equal to that of the torque waveform (C in FIG. 4) to suppress the torque ripple.

The ripple rate of the modulating signal $i_c$ can be arbitrarily set by the resistance ratio of the resistor 82 to the resistor 44. In this example, the resistance of the resistor 82 is set 0.35 times that of the resistor 44 to minimize the torque ripple. In any case that the harmonics contents of the waveforms of the differential output voltages of the Hall effect devices and of the waveforms of the voltages induced in the coils differ from those in the above case, the resistance ratio of the resistor 44 to the resistor 82 may be changed to an appropriate value to minimize the torque ripple.

This setting of the resistance ratio needs not be performed for each individual motor of the same structure, because the harmonics contents of the differential output voltages of the Hall effect devices and of the voltages induced in the coils are considered substantially the same for all motors of the same structure.

Figure 5:
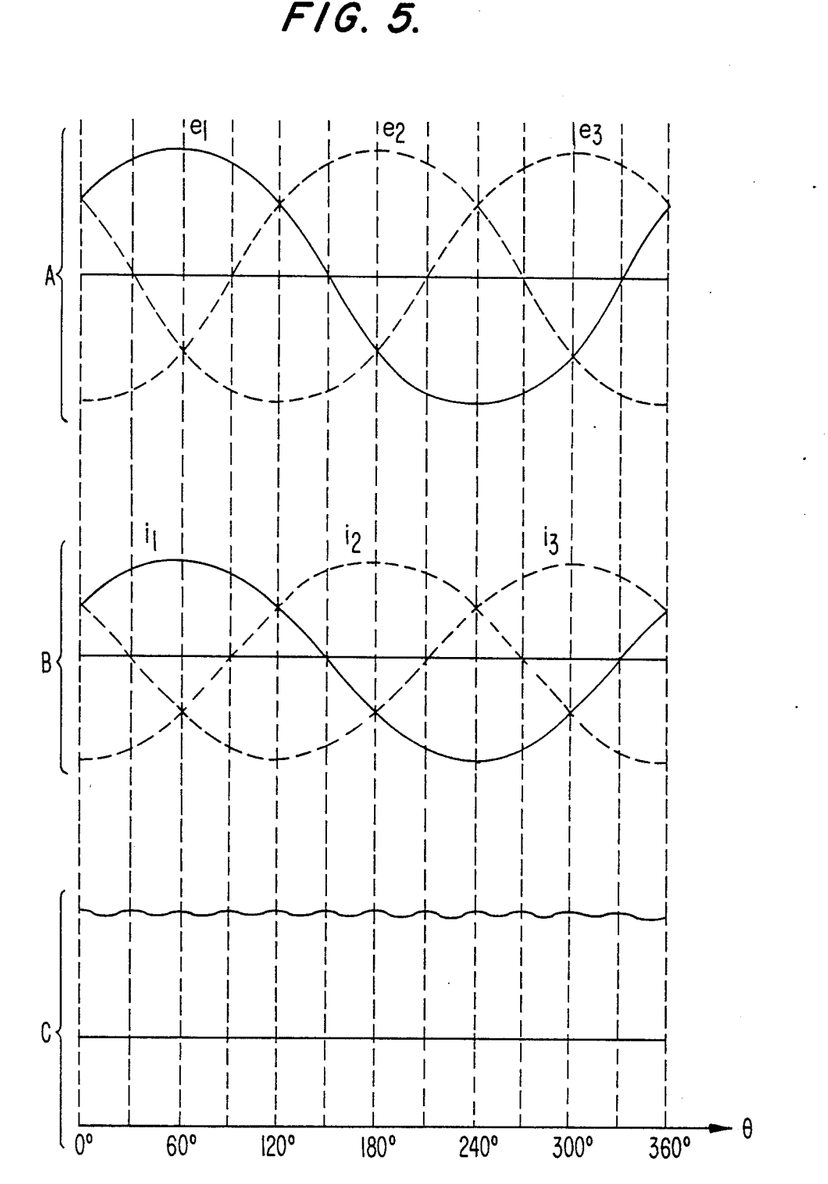
FIG. 5 is a waveform diagram obtained when the sum of the electric currents supplied to three-phase armature coils is modulated.

FIG. 5 shows waveforms obtained when the ripple of the torque waveform is suppressed by modulating the sum of the currents supplied to the three-phase armature coils of the motor with the modulating signal $i_c$. In FIG. 5, A shows waveforms of the voltages $e_1$, $e_2$, $e_3$ induced in the three-phase phase coils 4, 5, 6, respectively; B shows waveforms of the currents $i_1$, $i_2$, $i_3$ supplied to the coils 4, 5, 6 when the sum of the currents flowing into the coils is modulated with the modulating signal $i_c$; and C shows a waveform of the torque produced by the motor when the currents shown in B are supplied to the armature coils of the motor. In this case, the main component of the torque ripple is the twelfth order component. The magnitude of the ripple is suppressed to 2.8%$_{p-p}$.

Figure 6:
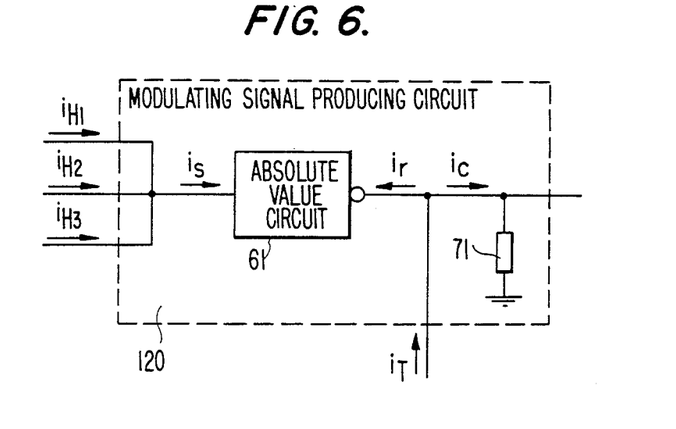
FIG. 6 is a circuit diagram of another example of modulating signal producing circuit that can be used in the driving circuit shown in FIG. 1.

FIG. 6 shows another example of the modulating signal producing circuit 120. This circuit consists of an absolute value circuit 61 to which a sum $i_s$ of the output currents $i_{H1}$, $i_{H2}$, $i_{H3}$ of the buffer amplifiers 21, 22, 23 are applied, the sum $i_s$ being given by $i_s = i_{H1} + i_{H2} + i_{H3}$. The sum current $i_s$ is converted into an absolute value which is a current i r ($= |i_s|$). Then, the modulating signal $i_c$ is produced by taking the difference between the output current $i_T$ of the instruction signal producing circuit 80 and the output current $i_r$ of the absolute value circuit 61.

Figure 7:
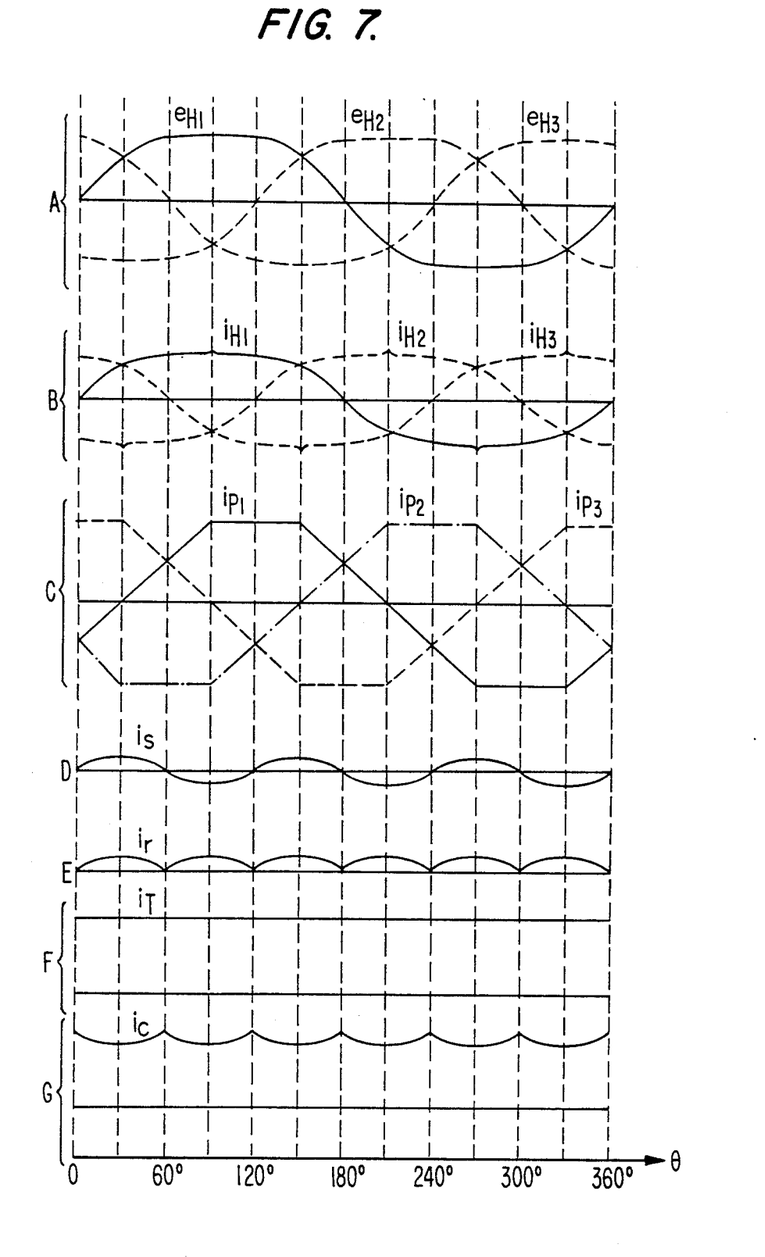
FIG. 7 is a diagram showing waveforms appearing at specified portions in the driving circuit shown in FIG. 1 when the driving circuit uses the modulating signal producing circuit shown in FIG. 6.

FIG. 7 shows waveforms appearing at specified portions in the circuit shown in FIG. 1 when the modulating signal producing circuit shown in FIG. 6 is used. Since the waveforms shown in A, B and C in FIG. 7 are the same as the waveforms shown in A, B and C in FIG. 3, they will not be explained herein. In FIG. 7, D shows a waveform of the current $i_s$ obtained by summing up the output currents $i_{H1}$, $i_{H2}$, $i_{H3}$ of the buffer amplifiers 21, 22, 23. The currents $i_{H1}$, $i_{H2}$, $i_{H3}$ are shifted in phase by 120° from each other. Each of these current waveforms contains harmonics of the third, fifth and seventh orders. In this specific example, the third, fifth and seventh order components account for 12.8%, 4.6%, 1.5%, respectively, of the fundamental wave. The fundamentals and the harmonics of the fifth and seventh orders of the currents $i_{H1}$, $i_{H2}$, $i_{H3}$ are canceled out by the addition of these three currents. The third order harmonic component is left in the resultant current $i_s$ and the magnitude thereof accounts for 38.4% (12.8% × 3) of the fundamental of each of the output currents $i_{H1}$, $i_{H2}$, $i_{H3}$ of the buffer circuits 21, 22, 23.

In FIG. 7, E shows a waveform of the output current $i_r$ of the absolute value circuit 61. The direction in which the current flows into the circuit 61 is taken as positive direction. The relation between the current $i_r$ and the total current $i_s$ is as follows:

$$i_r = |i_s| = |i_{H1} + i_{H2} + i_{H3}|$$

In FIG. 7, F shows the output current $i_T$ of the instruction signal producing circuit 80, the magnitude of the current $i_T$ being proportional to the externally given instruction signal $E_T$.

In FIG. 7, G shows the current $i_c$ flowing into the resistor 71. There exists the relation $i_c = i_T - i_r$ between the output current $i_T$ of the instruction signal producing circuit 80 and the output current $i_r$ of the absolute value circuit 61. The current $i_c$ (G in FIG. 7) contains the sixth order ripple component. As shown in FIG. 7, the output current $i_r$ (E in FIG. 7) of the circuit 61 is in phase with the ripple component of the torque waveform (C in FIG. 4). Therefore, in order to reverse the phase, the current $i_r$ is subtracted from the constant current $i_T$ (F in FIG. 7) proportional to the instruction signal. Thus, the modulating signal $i_c$ (G in FIG. 7) is produced. The current detecting resistor 90 converts the sum of the currents supplied to the armature coils of the motor into a voltage which is applied to one input terminal of the second error amplifier 70. The difference between the output current $i_T$ of the instruction signal producing circuit 80 and the output current $i_r$ of the absolute value circuit 61 is produced to obtain the modulating signal current $i_c$. The current $i_c$ is converted into a voltage by the resistor 71, and this voltage is applied to the other input terminal of the second error amplifier 70. The gains of the power supply circuits 101, 102, 103 are so adjusted that the two input voltages applied to the error amplifier 70 become equal to each other. The ripple rate of the modulating signal $i_c$ is made equal to that of the ripple waveform shown in C in FIG. 4 to suppress the torque ripple. The ripple rate of the modulating signal $i_c$ can be arbitrarily set by the resistance ratio of the resistor 82 to the resistor 44. In this case, the resistance of the resistor 82 is set 0.6 times the resistance of the resistor 44 to minimize the torque ripple.

Figure 8:
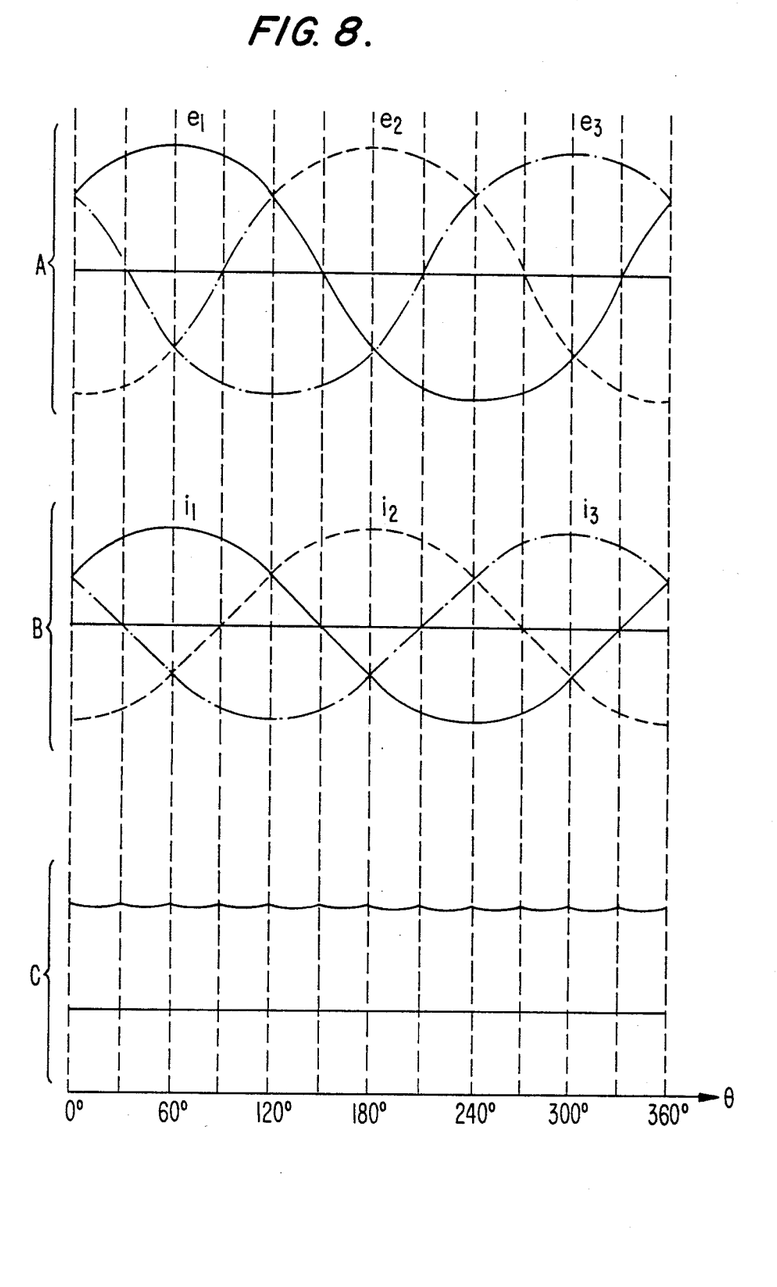
FIG. 8 is a waveform diagram obtained when the sum of the electric currents supplied to three-phase armature coils is modulated with the output signal from the modulating signal producing circuit shown in FIG. 6.

FIG. 8 shows waveforms obtained when the ripple of the torque waveform is suppressed by modulating the sum of the currents flowing into the armature coils of the motor with the modulating signal $i_c$ by the circuit shown in FIG. 1. In FIG. 8, A shows waveforms of the voltages $e_1$, $e_2$, $e_3$ induced in the coils 4, 5, 6; B shows waveforms of the currents $i_1$, $i_2$, $i_3$ supplied to the coils 4, 5, 6 when the sum of these currents is modulated with the modulating signal $i_c$; and C shows a waveform of the torque produced by the motor when the currents shown in B are supplied to the armature coils of the motor. In this case, the main component of the torque ripple is the twelfth order harmonic. The magnitude of the torque ripple is suppressed to $4.2\%_{p-p}$.

As already described in connection with FIG. 4, when the sum of the currents flowing into the coils 4, 5, 6 of the motor is not modulated, the main ripple component is the sixth order harmonic and its magnitude is approximately $14\%_{p-p}$. When the sum of the currents flowing into the coils 4, 5, 6 is modulated with the modulating signal $i_c$, the sixth order harmonic component is reduced below $0.5\%_{p-p}$. Since the twelfth order harmonic component of the remaining torque ripple has a high frequency, the variation of the rotation of the motor due to the torque ripple is sufficiently attenuated due to the inertia of the rotor. Thus, no practical problems arise.

In the example described in conjunction with FIG. 1, the output signal of the first error amplifier 50 controls the gains of the buffer amplifiers 21, 22, 23. But, it is also possible to directly control the input voltages applied to the Hall effect devices 1, 2, 3 by the output signal of the first error amplifier 50.

Motors to which the novel driving circuit of the invention is applicable are not limited to the flat-type slotless motors as shown in FIG. 2. But, the driving circuit of the invention may be applied also to slotted motors and cylindrical motors. In the description above, Hall effect devices are used as the position detectors, but obviously, any other kinds of sensors may also be used as long as they can produce a similar signal as the Hall effect devices.

What is claimed is:

1. A driving circuit for a brushless DC motor, comprising:
    a magnetic pole position detecting circuit for detecting postions of magnetic poles of a rotor magnet of the motor and delivering polyphase signals indicative of the positions;
    a rectifier adder circuit for producing a sum of positive or negative portions of the polyphase signals from the magnetic pole position detecting circuit;
    an instruction signal producing circuit for producing a torque instruction signal instructing a torque to be produced by the motor;
    a first error amplifier for adjusting a gain of the magnetic pole position detecting circuit so as to make an output signal from the rectifier adder circuit be proportional to the torque instruction signal;
    a power supply circuit responsive to the polyphase signals for supplying currents to polyphase armature coils of the motor;
    a current detecting means for detecting the currents supplied to the armature coils;
    a modulating signal producing circuit for modulating the currents supplied to the armature coils; and
    a second error amplifier for adjusting a gain of the power supply circuit so as to make an output signal from the current detecting means equal to an output signal from the modulating signal producing circuit.

2. The driving circuit as set forth in claim 1, wherein said modulating signal producing circuit comprises an absolute value adder circuit for converting the polyphase signals from the magnetic pole position detecting circuit into absolute values and summing said values and a combining circuit for producing a combination signal from the absolute value adder circuit and the instruction signal producing circuit.

3. The driving circuit as set forth in claim 2, wherein said combining circuit produces a different signal corresponding to a difference between the torque instruction signal from the instruction signal producing circuit and the output signal from the absolute value adder circuit.

4. The driving circuit as set forth in claim 1, wherein said modulating signal producing circuit comprises an absolute value circuit for converting a sum of the polyphase signals from the magnetic pole position detecting circuit into an absolute value, and a combining circuit for producing a combination signal from the absolute value circuit and the instruction signal producing circuit.

5. The driving circuit as set forth in claim 4, wherein said combining circuit produces a difference signal corresponding to the difference between the torque instruction signal from the instruction signal producing circuit and the output signal from the absolute value circuit.

6. The driving circuit as set forth in calim 1, wherein said current detecting means passes the currents to be supplied to the polyphase armature coils through a common resistor sq as to convert a sum of the currents into a voltage.

7. A driving circuit for a brushless DC motor, comprising:
    a magnetic pole position detecting circuit for detecting positions of magnetic poles of a rotor magnet of the motor and delivering polyphase signals indicative of the positions;
    a subtractor citcuit for producing difference signals corresponding to the difference between two of the polyphase signals from the magnetic pole position detecting circuit;
    a rectifier adder circuit for producing a sum of positive or negative portions of the difference signals from the subtractor circuit;
    an instruction signal producing circuit for producing a torque instruction signal instructing a torque to be proudced by the motor;
    a first error amplifier for adjusting a gain of the magnetic pole position detecting circuit so as to make an output signal from the rectifier adder circuit be proportional to the torque instruction signal;
    a power supply circuit responsive to the difference signals for supplying currents to polyphase armature coils of the motor;
    a current detecting means for detecting the currents supplied to the armature coils;
    a modulating signal producing circuit for modulating the currents supplied to the armature coils; and
    a second error amplifier for adjusting a gain of the power supply circuit so as to make an output signal from the current detecting means equal to an output signal from the modulating signal producing circuit.

8. The driving circuit as set forth in claim 7, wherein said modulating signal producing circuit comprises an absolute value adder circuit for converting the polyphase signals from the magnetic pole possition detecting circuit into absolute values and summing said values, and a combining circuit for producing a combination signal from the absolute value adder circuit and the instruction signal producing circuit.

9. The driving circuit as set forth in claim 8, wherein said combining circuit produces a difference signal corresponding to the difference between the torque instruction signal from the instruction signal producing circuit and the output signal from the absolute value adder circuit.

10. The driving circuit as set forth in claim 7, wherein said modulating signal producing circuit comprises an absolute value circuit for converting a sum of the polyphase signals from the magnetic pole position detecting circuit into an absolute value, and a combining circuit for producing a combination signal from the absolute value circuit and the instruction signal producing circuit.

11. The driving circuit as set forth in claim 10, wherein said combining circuit produces a difference signal corresponding to the difference between the torque instruction signal from the instruction signal producing circuit and the output signal from the absolute value circuit.

12. A driving circuit for a brushless DC motor, comprising:
 a plurality of a magnetoelectric converter devices mounted on a stator of the motor for detecting a magnetic field generated by a rotor magnet of the motor;
 buffer amplifiers for amplifying output signals from the magnetoelectric converter devices;
 a subtractor circuit for producing different signals corresponding to the difference between two of the output signal from the buffer amplifiers;
 a rectifier adder circuit for producing a sum of positive or negative portions of the difference signals from the subtractor circuit;
 an instruction signal producing circuit for producing a torque instruction signal indicating a torque to be produced by the motor;
 a first error amplifier for adjusting gains of the buffer amplifiers so as to make an output signal from the rectifier adder circuit be proportional to the torque instruction signal;
 a power supply circuit responsive to the difference signals from the subtractor circuit for supplying currents to polyphase armature coils of the motor;
 a current detecting means for detecting the currents supplied to the armature coils;
 a modulating signal producing circuit for modulating the currents supplied to the armature coils; and
 a second error amplifier for adjusting a gain of the power supply circuit so as to make an output signal from the current detecting means equal to an output signal from the modulating signal producing circuit.

13. The driving circuit as set forth inclaim 12, wherein said modulating signal producing circuit comprises an absolute value adder circuit for converting the output signals from the buffer amplifiers into absolute values and summing said values, and a combining circuit for producing a combination signal from the absolute value adder circuit and the instruction signal producing circuit.

14. The driving circuit as set forth in claim 13, wherein said combining circuit produces a difference signal corresponding to the difference between the torque instruction signal from the instruction signal producing circuit and the output signal from the absolute value adder circuit.

15. The driving circuit as set forth in claim 12, wherein said modulating signal producing circuit comprises an absolute value circuit for converting a sum of the output signals from the buffer amplifiers into an absolute value, and a combining circuit for producing a combination signal from the absolute value circuit and the instruction signal producing circuit.

16. The driving circuit as set forth in claim 15, wherein said combining circuit produces a difference signal corresponding to a difference between the torque instruction signal from the instruction signal producing circuit and the output signal from the absolute value circuit.

17. The driving circuit as set forth in claim 12, wherein said current detecting means passes the currents to be supplied to the polyphase armature coils through a common resistor to convert a sum of the currents into a voltage.

* * * * *